(12) United States Patent
Feyereisen et al.

(10) Patent No.: US 10,569,898 B2
(45) Date of Patent: Feb. 25, 2020

(54) METHOD AND SYSTEM FOR GENERATING AN ALERT FOR AN AIRCRAFT POTENTIALLY EXCEEDING SPEED LIMITS IN RESTRICTED AIRSPACE

(71) Applicant: HONEYWELL INTERNATIONAL INC., Morris Plains, NJ (US)

(72) Inventors: Thea L. Feyereisen, Hudson, WI (US); Gang He, Morristown, NJ (US); Jary Engels, Peoria, AZ (US); Subash Samuthirapandian, Tamilnadu (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 45 days.

(21) Appl. No.: 15/935,943

(22) Filed: Mar. 26, 2018

(65) Prior Publication Data
US 2019/0291889 A1 Sep. 26, 2019

(51) Int. Cl.
*B64D 45/00* (2006.01)
*G01C 23/00* (2006.01)
*G08G 5/00* (2006.01)
*B64D 43/00* (2006.01)

(52) U.S. Cl.
CPC ............ *B64D 45/00* (2013.01); *B64D 43/00* (2013.01); *G01C 23/00* (2013.01); *G01C 23/005* (2013.01); *G08G 5/003* (2013.01); *G08G 5/006* (2013.01); *G08G 5/0013* (2013.01); *G08G 5/0021* (2013.01); *G08G 5/0052* (2013.01)

(58) Field of Classification Search
CPC ........ B64D 45/00; B64D 43/00; G08G 5/003; G01C 23/00
See application file for complete search history.

(56) References Cited

U.S. PATENT DOCUMENTS

| 5,121,325 A | 6/1992 | DeJonge |
| 6,195,609 B1 * | 2/2001 | Pilley ................... G01C 23/00 701/120 |
| 6,515,596 B2 * | 2/2003 | Awada ............. G08G 1/096716 340/901 |
| 6,681,158 B2 | 1/2004 | Griffith et al. |

(Continued)

FOREIGN PATENT DOCUMENTS

EP 2302325 A2 3/2011

*Primary Examiner* — Frederick M Brushaber
(74) *Attorney, Agent, or Firm* — Lorenz & Kopf, LLP

(57) ABSTRACT

Methods and systems are provided for generating an alert for an aircraft potentially exceeding speed limits in airspace with speed limitations. The method comprises retrieving a flight plan for the aircraft and identifying airspace with speed limitations along the flight plan. A speed profile is generated based on the in-flight aircraft's current position, speed and trajectory. Any predicted speed violations are identified by comparing the speed profile with the airspace with speed limitations along the flight plan. A predictive time window is calculated that allows for the in-flight aircraft to decelerate sufficiently to comply with the speed limits of the airspace with speed limitations. The predictive time window includes a zone for the aircraft to reduce its airspeed and a reaction buffer zone to allow the aircrew sufficient time to comply with instructions to decelerate the aircraft. Finally, an alert is generated for the crew of the in-flight aircraft upon entering the predictive time window.

18 Claims, 4 Drawing Sheets

(56) References Cited

U.S. PATENT DOCUMENTS

| | | | |
|---|---|---|---|
| 6,943,701 B2 | 9/2005 | Zeineh | |
| 7,259,693 B2 | 8/2007 | Miller et al. | |
| 7,756,632 B2 | 7/2010 | Wise et al. | |
| 7,818,099 B2 | 10/2010 | Kemp | |
| 8,234,068 B1* | 7/2012 | Young | G01C 21/00 244/175 |
| 8,244,418 B1* | 8/2012 | Frank | G01C 23/00 701/14 |
| 8,456,328 B2 | 6/2013 | Karthikeyan et al. | |
| 8,554,393 B2 | 10/2013 | He et al. | |
| 9,026,275 B1* | 5/2015 | Young | G08G 5/003 701/11 |
| 9,704,405 B2* | 7/2017 | Kashi | G08G 5/0095 |
| 2006/0271275 A1* | 11/2006 | Verma | G07C 5/0816 701/532 |
| 2007/0001830 A1* | 1/2007 | Dagci | B60K 31/185 340/438 |
| 2007/0152844 A1* | 7/2007 | Hartley | G08G 1/0104 340/905 |
| 2007/0198160 A1* | 8/2007 | Sheynblat | B60K 31/0058 701/93 |
| 2008/0048879 A1* | 2/2008 | Lipman | B60K 37/02 340/688 |
| 2008/0306638 A1 | 12/2008 | Gutierrez-Castaneda et al. | |
| 2009/0157249 A1* | 6/2009 | Yang | G01C 21/26 701/32.4 |
| 2009/0195413 A1* | 8/2009 | Constans | G05D 1/0676 340/971 |
| 2009/0322567 A1 | 12/2009 | Stock et al. | |
| 2010/0292871 A1* | 11/2010 | Schultz | G01C 21/00 701/3 |
| 2011/0118908 A1* | 5/2011 | Boorman | G08G 5/0021 701/14 |
| 2014/0266807 A1 | 9/2014 | Behara et al. | |
| 2014/0343764 A1 | 11/2014 | Sacle et al. | |
| 2014/0365041 A1 | 12/2014 | Deker et al. | |
| 2016/0069688 A1 | 3/2016 | Polansky et al. | |
| 2016/0240087 A1 | 8/2016 | Kube et al. | |
| 2016/0318446 A1* | 11/2016 | Van Steenkist | B60Q 9/008 |

* cited by examiner

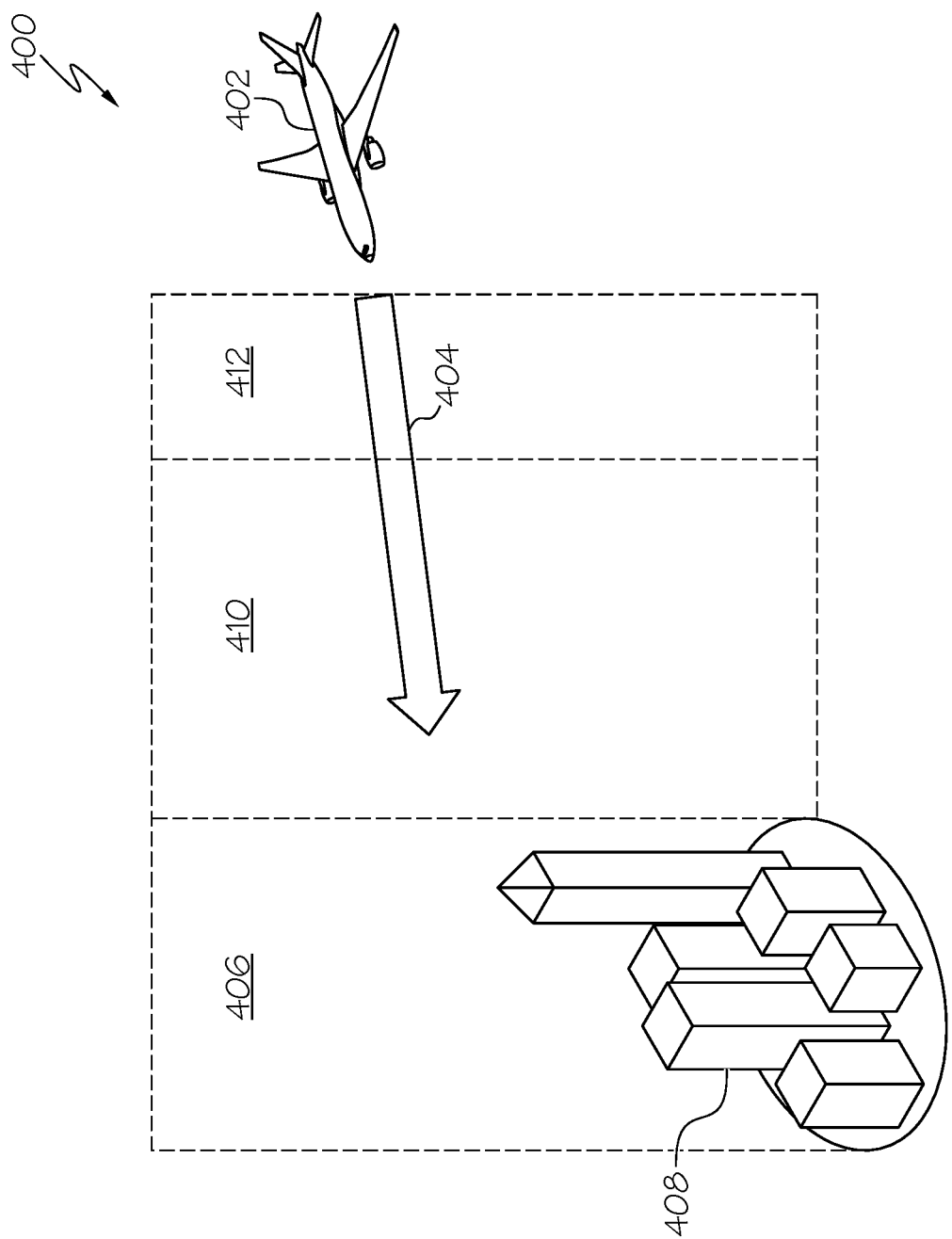

METHOD AND SYSTEM FOR GENERATING AN ALERT FOR AN AIRCRAFT POTENTIALLY EXCEEDING SPEED LIMITS IN RESTRICTED AIRSPACE

TECHNICAL FIELD

The present invention generally relates to aircraft operations, and more particularly relates to generating an alert for an aircraft potentially exceeding speed limits in airspace with speed limitations.

BACKGROUND

The International Civil Aviation Organization (ICAO) provides various classifications for airspace that include speed limits for aircraft, especially below certain altitudes while within a defined airspace. Aircraft speed may also be restricted in defined visual flight rules (VFR) corridors. However, due to cockpit workload, a pilot may inadvertently forget about a speed restriction and commit of violation while in the airspace with speed limitations. Hence, there is a need for a method and system for generating alert for an aircraft potentially exceeding speed limits in airspace with speed limitations.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for generating an alert for an aircraft potentially exceeding speed limits in airspace with speed limitations. The method comprises: retrieving a flight plan for an in-flight aircraft; identifying speed limited airspace along the flight plan; generating a predictive speed profile based on the in-flight aircraft's current position, speed and trajectory; identifying any predicted speed violations by comparing the predictive speed profile with the identified speed limited airspace along the flight plan; calculating a predictive time window that allows for the in-flight aircraft to decelerate sufficiently to comply with the speed limits of the speed limited airspace, where the predictive time window includes, a sufficient time period for the in-flight aircraft to reduce its airspeed based on a predetermined deceleration rate, and a reaction buffer time period to allow the aircrew of the in-flight aircraft sufficient time to comply with instructions to decelerate the in-flight aircraft; and generating an alert for the crew of the in-flight aircraft upon entering the predictive time window.

A system is provided for generating alert for an aircraft potentially exceeding speed limits in airspace with speed limitations. The system comprises: an electronic data storage medium that stores the flight plan for an in-flight aircraft; an electronic navigational database that stores data regarding airspace with speed limitations; a microprocessor located on board the in-flight aircraft, the microprocessor configured to, retrieve the flight plan for the in-flight aircraft from the electronic data storage medium, identify speed limited airspace along the flight plan by comparing the flight plan with data retrieved from the electronic navigational database, generate a predictive speed profile based on the in-flight aircraft's current position, speed and trajectory, identify any predicted speed violations of the in-flight aircraft by comparing the predictive speed profile with the identified speed limited airspace along the flight plan, calculate a predictive time window that allows for the in-flight aircraft to decelerate sufficiently to comply with the speed limits of the speed limited airspace, where the predictive time window includes, a sufficient time period for the in-flight aircraft to reduce its airspeed based on a predetermined deceleration rate, and a reaction buffer time period to allow the aircrew of the in-flight aircraft sufficient time to comply with instructions to decelerate the in-flight aircraft, and generate an alert upon the in-flight aircraft entering the predictive time window; and a graphical display device that receives the alert from the microprocessor and displays the alert to the crew of the in-flight aircraft.

A method is provided for generating an alert for an aircraft potentially exceeding speed limits in airspace with speed limitations. The method comprises: generating a predictive speed profile based on the in-flight aircraft's current position, speed and trajectory; identifying speed limited airspace with data retrieved from a navigational database; identifying any predicted speed violations by comparing the predictive speed profile with the identified speed limited airspace; calculating a predictive time window that allows for the in-flight aircraft to decelerate sufficiently to comply with the speed limits of the speed limited airspace, where the predictive time window includes, a sufficient time period for the in-flight aircraft to reduce its airspeed based on a predetermined deceleration rate, and a reaction buffer time period to allow the aircrew of the in-flight aircraft sufficient time to comply with instructions to decelerate the in-flight aircraft; and generating an alert for the crew of the in-flight aircraft upon entering the predictive time window, where the alert is displayed on a graphical display device on board the aircraft.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 4 shows a diagram of an aircraft approaching a predictive time window that allows sufficient deceleration of an aircraft before exceeding speed limits in airspace with speed limitations in accordance with one embodiment.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for generating an alert for an aircraft potentially exceeding speed limits in airspace with speed limitations has been developed. First, a flight plan for the aircraft is retrieved and compared to airspace with speed limitations along the flight plan. A predictive speed profile is generated based on the in-flight aircraft's current performance parameters including position, speed and trajectory. Predicted speed violations are identified by comparing the predictive speed profile with the speed airspace with speed limitations along the flight plan. If any predicted speed violations are detected, a predictive time window is calculated that allows the in-flight aircraft sufficient time to decelerate to comply with the speed limits. The predictive time window includes deceleration zone to reduce airspeed at a predetermined deceleration rate and a reaction time zone to allow the air crew sufficient time to comply with the notice of a predictive speed violation. An alert for the aircrew is generated upon the in-flight aircraft entering the predictive time window to give the aircrew notice and time to correct the potential problem.

Figure 1:
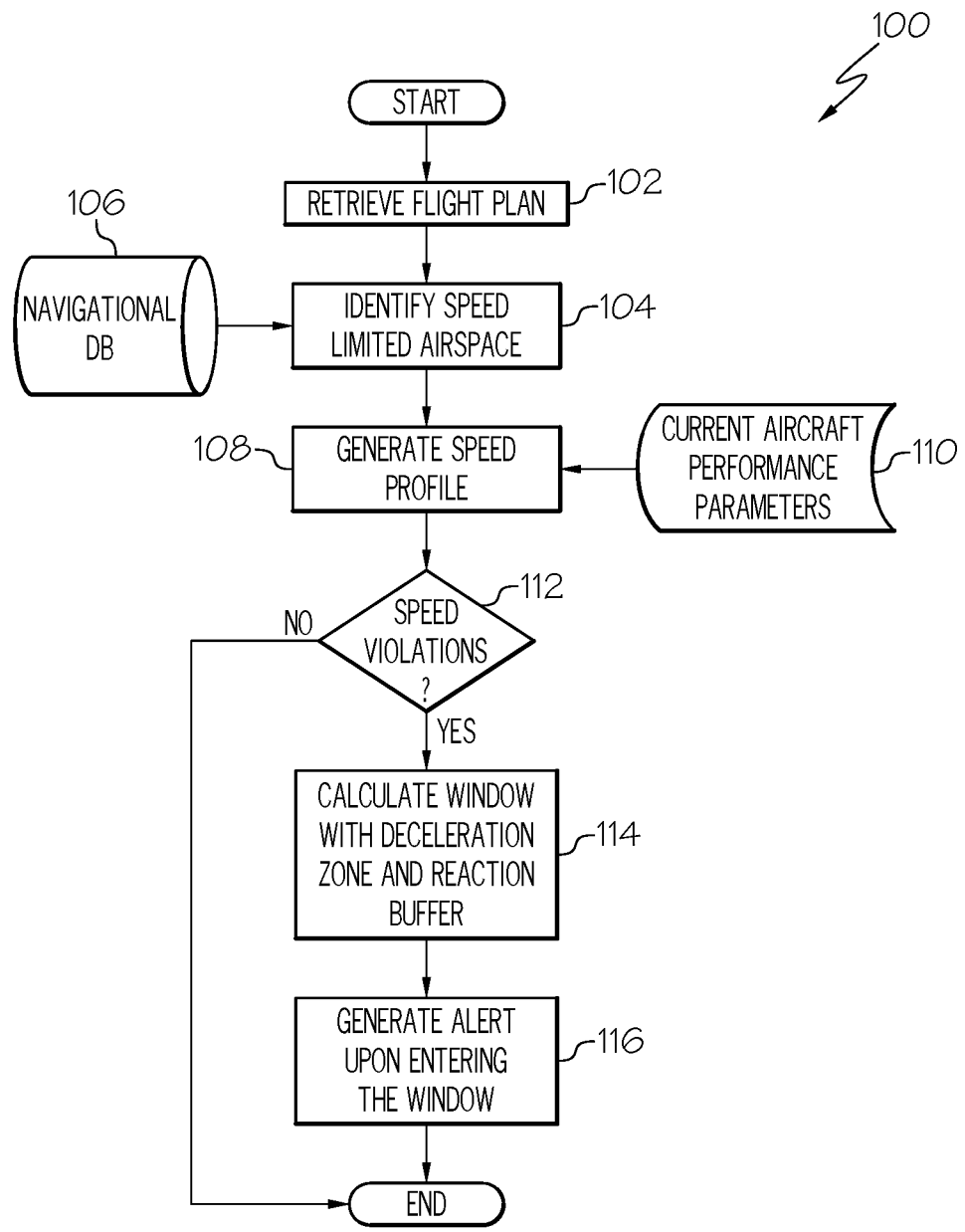
FIG. 1 shows a flowchart of a method for generating an alert for an aircraft potentially exceeding speed limits in airspace with speed limitations in accordance with one embodiment.

Turning now to FIG. 1, a flowchart 100 is shown of a method for generating an alert for an aircraft potentially exceeding speed limits in airspace with speed limitations in accordance with one embodiment. First, a flight plan for the in-flight aircraft is retrieved from an electronic storage device located on board the aircraft 102. In some embodiments, this electronic storage device may be a flight management system (FMS). Next, any speed-limited airspace along the flight plan is identified 104 by retrieving data from a navigational database 106. The current performance parameters of the in-flight aircraft are collected 110 and used to generate a speed profile for the aircraft 108. The performance parameters may include the aircraft's position, speed, heading and trajectory. In some embodiments, the speed profile is continuously updated with continuously monitored performance parameters of the aircraft. In other embodiments, a new predictive speed profile is generated only upon detection of a change in any of the aircraft performance parameters.

Any predicted speed violations are identified by comparing the predictive speed profile of the aircraft with the identified speed-limited airspace along the flight plan 112. If any potential speed violations are detected, a predictive time window is calculated that allows for the in-flight aircraft to decelerate sufficiently to comply with the speed limits of the airspace with speed limitations 114. The predictive time window includes a zone with a sufficient time period for the in-flight aircraft to reduce its airspeed based on a predetermined deceleration rate and a reaction time buffer zone that allows the aircrew sufficient time to comply with the instructions to decelerate the aircraft. In some embodiments, the predetermined deceleration rate is two knots per second (2 kt/sec). An alert is generated for the aircrew of the in-flight aircraft upon entering the predictive time window 116. The alert is displayed on a graphical display device on board the aircraft. The alert may be an audio, textual or graphic display notification to the aircrew. In alternative embodiments, the alert may be manually deactivated by the crew of the in-flight aircraft.

Figure 2:
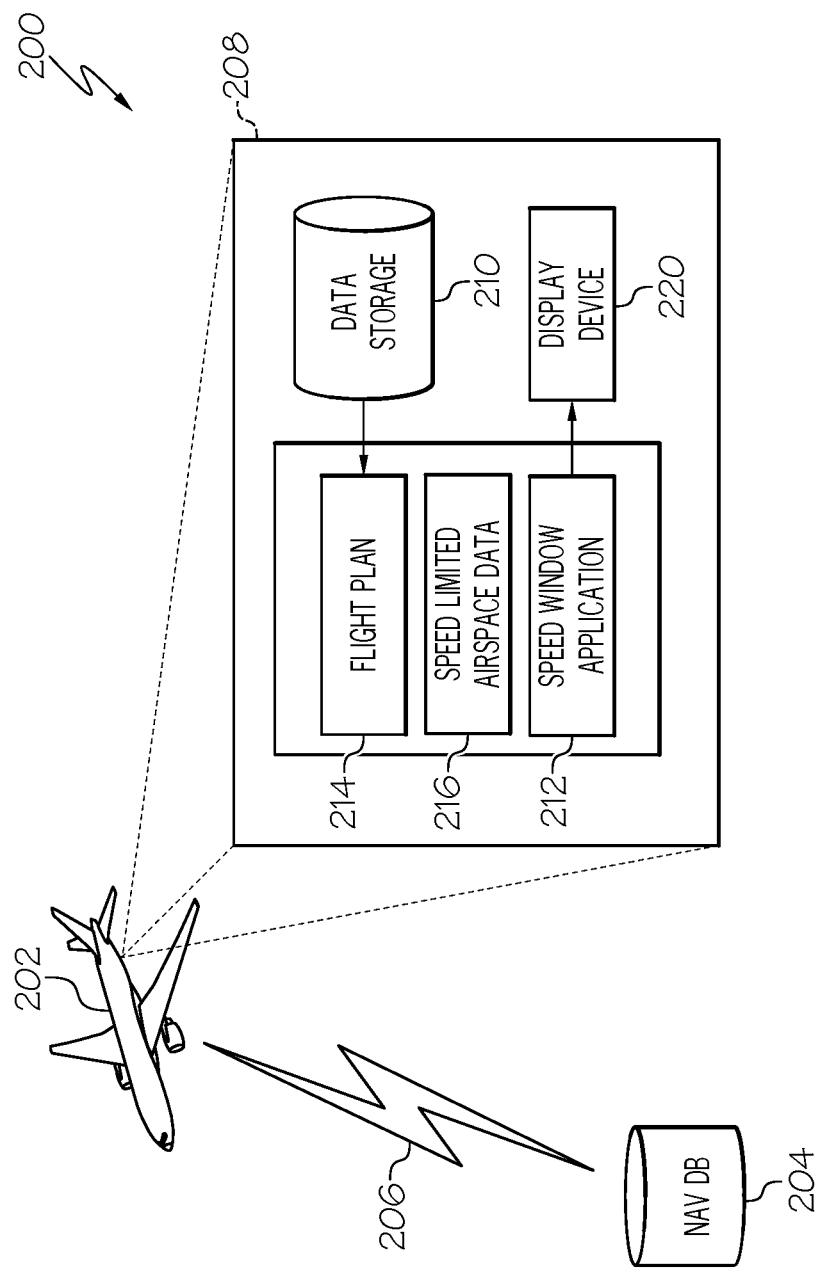
FIG. 2 shows a diagram of a system for generating alert for an aircraft potentially exceeding speed limits in airspace with speed limitations in accordance with one embodiment.

Turning now to FIG. 2, a diagram 200 of a system for generating an alert for an aircraft potentially exceeding speed limits in airspace with speed limitations is shown in accordance with some embodiments. In this system, an in-flight aircraft 202 has an onboard electronic management system 208 that includes an electronic data storage medium 210 and microprocessor 212. In some embodiments, the data storage medium 210 and microprocessor 212 may be part of an onboard flight management system (FMS). The electronic data storage medium 210 contains the flight plan 214 for the in-flight aircraft 202. An electronic navigational database 204 is located off board the aircraft 202. The navigational database provides data 216 to the in-flight aircraft 202, via a data communications link 204, regarding airspace with speed limitations. In alternative embodiments, the electronic navigational database 204 may be located on board the in-flight aircraft.

The microprocessor 212 is loaded with an application 218 that retrieves the flight plan from the electronic data storage medium 210, and identifies speed limited airspace along the flight plan 214 by comparing it with data 216 retrieved from the electronic navigational database 204. The microprocessor 212 then generates a predictive speed profile based on the in-flight aircraft's current performance parameters and identifies any predicted speed violations by comparing the predictive speed profile with the identified speed limited airspace along the flight plan. The current flight parameters of the aircraft may include the aircraft's position, speed, heading and trajectory.

If any predicted speed violations are identified, the application will calculate a predictive time window that allows for the in-flight aircraft to decelerate sufficiently to comply with the speed limits. The predictive time window includes a deceleration zone with a sufficient time period for the aircraft to reduce its airspeed based on a predetermined deceleration rate and a reactive time buffer zone that allows the aircrew of the in-flight aircraft sufficient time to comply with instructions to decelerate. The application will generate an alert when the in-flight aircraft enters the predictive time window. The alert will be provided to a graphical display device 220 that displays the alert to the crew of the in-flight aircraft.

Figure 3:
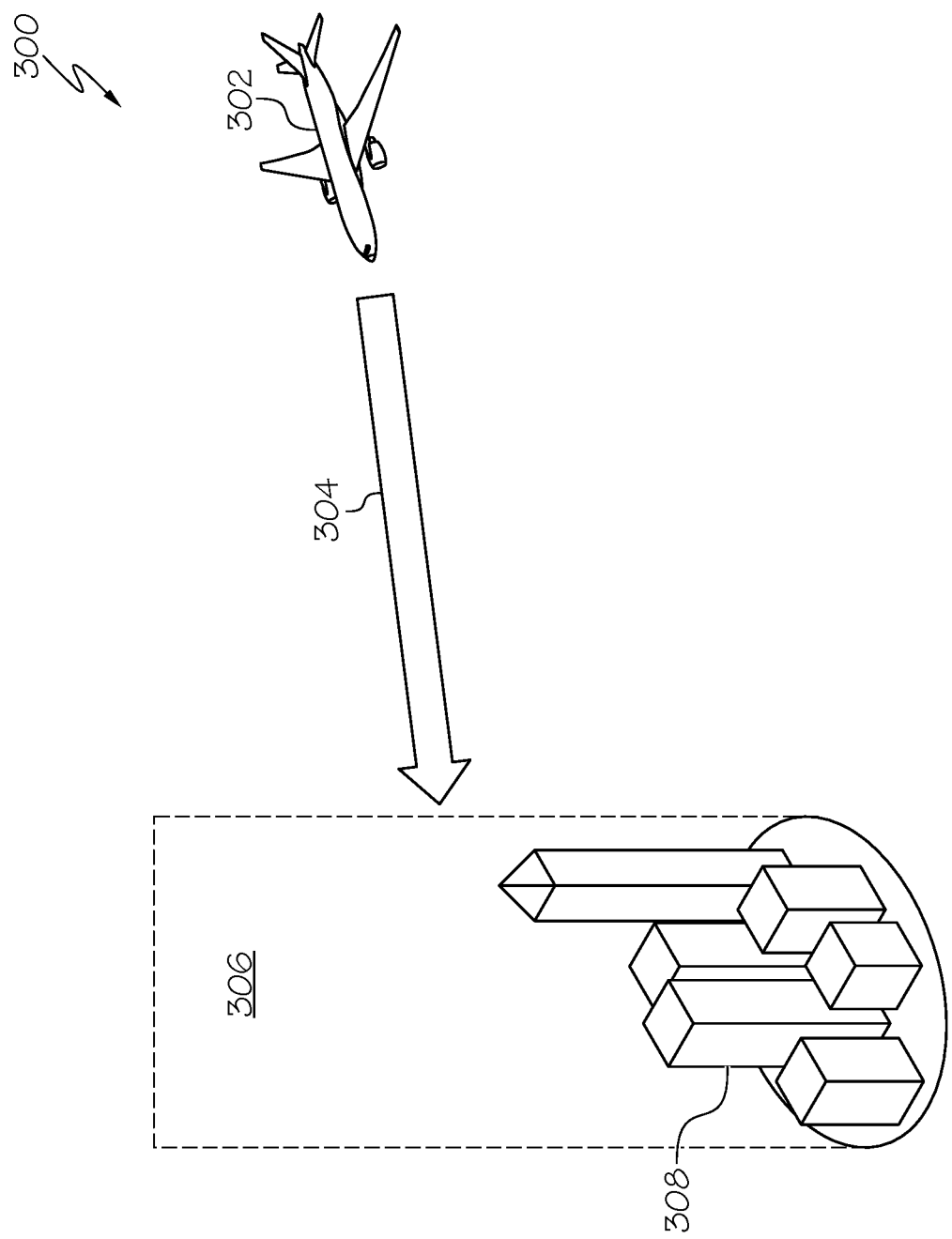
FIG. 3 shows a diagram of an aircraft potentially exceeding speed limits in airspace with speed limitations in accordance with one embodiment.

Turning now to FIG. 3, a diagram 300 is shown of an in-flight aircraft 302 potentially exceeding speed limits in airspace with speed limitations 306 in accordance with one embodiment. In this diagram, a flight plan 304 for the aircraft is retrieved and airspace with speed limitations 306 is identified over an urban area 308. Based on the aircraft's 302 current speed along its flight plan 304, the aircraft 302 will potentially violate the speed limit of the airspace with speed limitations 306. Turning now to FIG. 4, a diagram 400 is shown of an aircraft 402 approaching zones of a predictive time window 410 and 412 that allows sufficient deceleration of an aircraft 402 before exceeding speed limits in airspace with speed limitations 406 in accordance with one embodiment. As discussed in reference to FIG. 3, the aircraft 402 has a flight plan 408 that will potentially exceed the speed limit of airspace with speed limitations 406 above an urban area 408. As a result, a predictive time window is calculated that includes a deceleration zone 410 for the in-flight aircraft to reduce its airspeed based on a predetermined deceleration rate. Also included, is a reaction buffer zone 412 with a time period that allows the aircrew sufficient time to comply with notice to decelerate the aircraft 402. Once the aircraft enters the reaction time buffer zone 412, an alert is generated for the aircrew providing notification of the need to decelerate the aircraft.

In this example, the predetermined deceleration rate is two knots per second (2 kt/sec). If the aircraft 402 is 50 knots over the speed limit of the airspace with speed limitations 406, it will take 25 seconds for the plane to decelerate prior to entering the airspace with speed limitations 406. In addition, the aircrew of the aircraft will be given a 15 seconds buffer to receive the alert of a predictive speed violation and begin decelerating the aircraft. The size of the deceleration zone 410 and the buffer zone 412 are each calculated to provide sufficient time for the aircrew to react to the alert (15 seconds) and the aircraft to decelerate (25 seconds) to the proper speed.

The previously described embodiments have been focused on determining speed limits along a predetermined flight plan as reflected in the flight profile stored in the FMS. However, alternative embodiments may determine predicted speed violations of the aircraft based solely on its current trajectory without reference to a predetermined flight plan. For example, if the aircraft is being vectored away or flying off its flight plan and will encounter a speed limited airspace, alternative embodiments will detect a predicted speed violation and generate an alert based on the current speed. These alternative embodiments will also create a sufficient time period to reduce the airspeed based on a predetermined deceleration rate and a reactive time buffer zone that allows the aircrew sufficient time to comply with the instructions to decelerate.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for generating an alert for an aircraft potentially exceeding speed limits in airspace with speed limitations, comprising:
retrieving a flight plan for an in-flight aircraft from an electronic storage device on board the aircraft;
identifying speed limited airspace along the flight plan by comparing the flight plan with data retrieved from a navigational database, where the speed limited airspace comprises a defined airspace that is classified by regulatory authorities as having a speed limit for aircraft within the defined airspace;

generating a predictive speed profile based on the in-flight aircraft's current position, speed and trajectory;

identifying any predicted speed violations by comparing the predictive speed profile with the identified speed limited airspace along the flight plan;

calculating a predictive time window that allows for the in-flight aircraft to decelerate sufficiently to comply with the speed limits of the speed limited airspace, where the predictive time window includes,
  a sufficient time period for the in-flight aircraft to reduce its airspeed based on a predetermined deceleration rate, and
  a reaction buffer time period to allow the aircrew of the in-flight aircraft sufficient time to comply with instructions to decelerate the in-flight aircraft; and generating an alert for the crew of the in-flight aircraft upon entering the predictive time window, where the alert is displayed on a graphical display device on board the aircraft.

2. The method of claim 1, where the electronic storage device onboard the aircraft comprises an onboard flight management system (FMS).

3. The method of claim 1, where the speed limited airspace is identified from data retrieved via a data communication link from an off board navigational database.

4. The method of claim 3, where a new predictive speed profile is generated upon detection of any change to the in-flight aircraft's current position, speed or trajectory.

5. The method of claim 1, where the predictive speed profile is continuously monitored for any change to the in-flight aircraft's current position, speed or trajectory.

6. The method of claim 1, where the predetermined deceleration rate is 2 knots per second.

7. The method of claim 1, where the alert comprises an audio notification.

8. The method of claim 1, where the alert comprises a textual notification.

9. The method of claim 1, where the alert comprises a graphic display notification.

10. The method of claim 1, where the alert may be manually deactivated by the crew of the in-flight aircraft.

11. A system for generating an alert for an in-flight aircraft potentially exceeding speed limits in airspace with speed limitations, comprising:

an electronic data storage medium that stores the flight plan for an in-flight aircraft;

an electronic navigational database that stores data regarding airspace with speed limitations;

a microprocessor located on board the in-flight aircraft, the microprocessor configured to,
  retrieve the flight plan for the in-flight aircraft from the electronic data storage medium,
  identify airspace with speed limitations along the flight plan by comparing the flight plan with data retrieved from the electronic navigational database, where the airspace with speed limitations comprises a defined airspace that is classified by regulatory authorities as having a speed limit for aircraft within the airspace,
  generate a predictive speed profile based on the in-flight aircraft's performance parameters,
  identify any predicted speed violations of the in-flight aircraft by comparing the predictive speed profile with the identified airspace with speed limitations along the flight plan,
  calculate a predictive time window that allows for the in-flight aircraft to decelerate sufficiently to comply with the speed limits of the airspace with speed limitations, where the predictive time window includes, a sufficient time period for the in-flight aircraft to reduce its airspeed based on a predetermined deceleration rate, and a reaction buffer time period to allow the aircrew of the in-flight aircraft sufficient time to comply with instructions to decelerate the in-flight aircraft, and
  generate an alert upon the in-flight aircraft entering the predictive time window; and
a graphical display device that receives the alert from the microprocessor and displays the alert to the crew of the in-flight aircraft.

12. The system of claim 11, where the electronic data storage medium comprises a flight management system (FMS).

13. The system of claim 11, where the electronic navigational database is located off board the in-flight aircraft.

14. The system of claim 11, where the electronic navigational database is located on board the in-flight aircraft.

15. The system of claim 11, where the performance parameters of the in-flight aircraft comprise the in-flight aircraft's position.

16. The system of claim 11, where the performance parameters of the in-flight aircraft comprise the in-flight aircraft's speed.

17. The system of claim 11, where the performance parameters of the in-flight aircraft comprise the in-flight aircraft's heading.

18. A method for generating an alert for an aircraft potentially exceeding speed limits in airspace with speed limitations, comprising:

generating a predictive speed profile based on the in-flight aircraft's current position, speed and trajectory;

identifying airspace with speed limitations with data retrieved from a navigational database, where the airspace with speed limitations comprises a defined airspace that is classified by regulatory authorities as having a speed limit for aircraft within the airspace;

identifying any predicted speed violations by comparing the predictive speed profile with the identified airspace with speed limitations;

calculating a predictive time window that allows for the in-flight aircraft to decelerate sufficiently to comply with the speed limits of the airspace with speed limitations, where the predictive time window includes,
  a sufficient time period for the in-flight aircraft to reduce its airspeed based on a predetermined deceleration rate, and
  a reaction buffer time period to allow the aircrew of the in-flight aircraft sufficient time to comply with instructions to decelerate the in-flight aircraft; and generating an alert for the crew of the in-flight aircraft upon entering the predictive time window, where the alert is displayed on a graphical display device on board the aircraft.

* * * * *